United States Patent [19]
Schermann et al.

[11] Patent Number: 5,917,251
[45] Date of Patent: Jun. 29, 1999

[54] METHOD AND CIRCUIT ARRANGEMENT TO COVER PEAK ENERGY DEMANDS IN ELECTRICAL ALTERNATING OR THREE-PHASE CURRENT NETWORKS

[75] Inventors: Dietolf Schermann, Neufahrn; Hans Heindlmeier, Holzkirchen, both of Germany

[73] Assignees: Bayernwerk AG, Muenchen; Hagen Batterie AG, Soest, both of Germany

[21] Appl. No.: 08/952,377

[22] PCT Filed: May 7, 1996

[86] PCT No.: PCT/EP96/01904

§ 371 Date: Feb. 12, 1998

§ 102(e) Date: Feb. 12, 1998

[87] PCT Pub. No.: WO96/36100

PCT Pub. Date: Nov. 14, 1996

[30] Foreign Application Priority Data

May 8, 1995 [DE] Germany ............ 195 16 838

[51] Int. Cl.[6] .................................................. H02J 7/34
[52] U.S. Cl. .................. 307/20; 307/18; 307/26; 307/29; 307/44; 307/45; 307/64
[58] Field of Search .................... 307/18, 64, 66, 307/44, 45, 46, 19–26, 29; 320/100

[56] References Cited

U.S. PATENT DOCUMENTS

| | | | |
|---|---|---|---|
| 3,823,358 | 7/1974 | Rey | 307/66 |
| 4,749,908 | 6/1988 | Stifter | 307/23 |
| 4,894,764 | 1/1990 | Meyer et al. | 307/66 |
| 5,500,561 | 3/1996 | Wilhelm | 307/64 |
| 5,532,525 | 7/1996 | Kaiser et al. | 307/18 |

*Primary Examiner*—Albert W. Paladini
*Attorney, Agent, or Firm*—Townsend and Townsend and Crew LLP

[57] ABSTRACT

A method and circuit arrangement for covering peak energy demand in an electrical AC or three-phase current network having a plurality of consumers of which at least some of the consumers are equipped with a stand-by power supply network having accumulators and at least one rectifier fed from the electrical network. The method includes feeding a fraction of energy from the accumulators of each individual stand-by power supply network into the electrical network via inverters for a short term peak demand of the electrical network. The fraction of energy is fed from the accumulators as long as peak demand is present and sufficient energy for the stand-by power supply is still available in the accumulators.

48 Claims, 2 Drawing Sheets

METHOD AND CIRCUIT ARRANGEMENT TO COVER PEAK ENERGY DEMANDS IN ELECTRICAL ALTERNATING OR THREE-PHASE CURRENT NETWORKS

BACKGROUND OF THE INVENTION

1. Field of the Invention

The invention relates to a method of covering energy peak demands in electrical alternating or three-phase current networks and to a circuit arrangement for covering peak energy demand in electrical alternating or three-phase current networks. A stand-by power supply is generally realized by a DC network fed from accumulators.

2. Description of the Prior Art

It is already known that the large electricity utilities have to reserve at least 2.5% of the total produced power as a so-called primary regulating reserve in order to make a quickly activatable, non-reactive, power reserve available in electricity supply systems.

This normally takes place by thermal producing units by means of the turbine operating mode "controlled flexi-pressure". In this way, up to 5% of the nominal power can be kept available as a primary regulating reserve with the required dynamic properties.

This manner of operation leads, however, on the one hand, to efficiency penalties. On the other hand, producer units with cost-favorable primary energy costs are not operated at their nominal power in order to keep available the 5% primary regulating reserve. Together they lead to extra cost in making electrical energy available.

Furthermore, it is known to use stand-by power supplies with rectifiers in electric stores for the stand-by power supply of, for example, driving voltage systems, telecommunication systems, interruption-free installation, such as, for example, computers, special emergency power supplies, for example, in operating theaters in hospitals, safety lighting systems, generating stations, substations, communication centers, hospitals, large buildings in general etc. The industrial accumulators or batteries used for this purpose generally have a working life of 10 to 20 years. However, they are only used about 50 times during their entire working life including the test periods. Such known stand-by power supplies are thus also ultimately un-economical because of the lack of use of the expensive electrochemical energy stores.

Finally, accumulator-based, auxiliary power stations are also known which are provided exclusively with accumulators and the charging devices required for them, of which the accumulators are charged up in low demand periods via rectifiers and which feed electrical energy into the attached network via inverters when a higher demand is present. These accumulator-based, auxiliary power stations are comparable with pumped storage power stations. They have to be made available specially to deliver the peak demand and otherwise have no function.

SUMMARY OF THE INVENTION

The object of the present invention is to provide a method and a circuit arrangement of the initially named kind which are able to make available extremely rapidly, but only for a short period of time, the peak energy demand for alternating and three-phase current networks with a low complexity and in a particularly economical manner.

The concept underlying the invention is to be seen in the fact that stand-by power supplies connected to the power networks and of which the individual capacity is not sufficient to satisfy the peak load demand, but whose sum total capacity can nevertheless achieve considerable values, are additionally used, apart from making available energy for the stand-by power supply, to additionally make available energy to cover a short term peak load demand.

The concentrated energy capacity of all or at least a large part of the attached stand-by power supplies, which is made available for a short period, serves primarily to bridge the period which is required for the power stations which make available the basic energy to run up to the new enhanced load demand.

In this way, the power stations do not have to be operated with power reserves, or at least not to the previously customary degree, so that the manner of operation of the power stations can be made substantially more economical.

On the other hand, in order to make available a considerable overload capacity for a short period of time, either no additional accumulator is required or the number of accumulators provided for the stand-by power supply is increased by a small multiple, for example, 6 times the normal capacity of the stand-by power supply the stand-by power supply also profits. Thus, primarily the decentral accumulators already present in the stand-by power supplies or added to the latter to a small degree are used, through controlled grouping from a center, to meet the short term peak demand. For this, attention need only be paid to ensuring that only a fraction of the stored energy is extracted so that they are still able to satisfy their actual function as a supplier of stand-by power.

As a result of the measures of the invention, the peak energy demand can be made available in the millisecond range. The invention is thus particularly suitable for making available secondary reserve power.

The realization of the invention in peak delivery operation is particularly suitable for the simultaneous use of accumulators for a stand-by power supply on the one hand and for network peak demand delivery operation on the other hand. As accumulators only have a restricted capacity for high currents, a situation is automatically achieved through the high current consumption necessary for a peak demand delivery operation that an adequate energy reserve still remains in the accumulators for the stand-by power supply, which is available, in contrast to peak load satisfaction, because the currents required for the stand-by power supply are kept so small that the capacity of the accumulators can be fully exhausted.

The customary characteristics of accumulators or batteries are particularly suitable for simultaneously making available a peak load reserve and a stand-by power supply.

The current extraction in peak load operation preferably sets in, as a result of suitable design of the inverters, so that the energy for the peak load demand is made available within 1 to 20 minutes and, in particular, from 2 to 10 minutes.

In a particularly economical and effective embodiment only a small fraction of the hourly capacity of the accumulators is admittedly extracted per unit of time during stand-by power supply, but during peak demand delivery, a current of the order of magnitude of 100% of the hourly capacity is taken from the accumulators in a short period—in similar manner, for example, for the starting of motor vehicles. This has the advantage that during peak demand delivery only a restricted part of the accumulator capacity becomes free and thus sufficient capacity for the stand-by power supply is maintained.

In this embodiment, electrical accumulators give up the full capacity when small quantities of current are taken for longer periods of time, but are simultaneously able to give up an extremely high current at a reduced capacity in an ideal manner to ensure an effective stand-by power supply on the one hand, and to make available peak demand energy on the other hand.

In order to be able to practice the energy extraction from the accumulators during peak load operation up to a level where the accumulator voltage sinks to such a degree that a problem-free, stand-by power supply is endangered, there is provided, in accordance with the invention, the further development of stand-by supply networks kept at a desired value by a DC voltage regulating apparatus. The basic concept of this further development lies in the fact that the sinking of the accumulator voltage is so compensated by a DC regulator, which is, in particular realized by a step-up setter, that the desired nominal voltage is available to the stand-by power loads. In this manner, a more substantial part of the accumulator capacity can be straightforwardly used to satisfy the peak demand, without the stand-by power supply being endangered. In general, it is possible when using a DC regulator apparatus to make available about 30% of the accumulator capacity to satisfy the peak demand, i.e. to make available a second or minute reserve, because the remainder of 70% is sufficient for the stand-by power supply, in particular, when the number of stand-by power supply accumulators is increased somewhat in accordance with the invention. The use of step-up setters to keep an output DC voltage constant, even when the accumulator voltage is sinking, is known per se, but satisfies a particular function in accordance with the present invention, because the stand-by power supply could no longer be ensured during the peak demand operation if the DC regulation were not able during this period of time to make available a substantially constant DC voltage for the stand-by power supply. With a normal stand-by power supply the step-up setters have, in contrast, only one additional function, namely that they are able to prolong the energy extraction from the accumulators, which is also ensured without them.

Since DC regulating apparatuses generally have a highest permissible maximum current, in a further embodiment of the present invention, in the case of a short circuit, adequate current can still flow on the stand-by load side, in order, for example, to allow fuses present in the stand-by load circuit to respond.

Another embodiment of the present invention has the advantage that high stand-by power accumulator capacities are already available in substations and the space required to increase the number of stand-by power accumulators is available.

In accordance with an embodiment of the present invention, a circuit arrangement for covering the peak energy demand in an electrical AC or three-phase current network having a plurality of consumers, of which at least some of the consumers are equipped with a stand-by power supply network that has accumulators and at least one rectifier fed from the electrical network for the charging of the accumulators. At least a substantial part of all the consumers equipped with a stand-by power supply network is additionally equipped with at least one inverter fed from the electrical accumulators that, by means of a control apparatus, can be applied to the electrical network instead of the rectifier. Additionally, the stand-by power supply network has a current conducting supply such that the accumulators can transmit a substantial fraction of their energy of 10% to 15% to the electrical network within the short period of time of a few minutes when the rectifiers are applied to the electrical network.

In accordance with one aspect of the present invention, a DC regulating apparatus is inserted between the accumulators and the stand-by power load that maintains the voltage applied to the stand-by power load at least substantially constant up to a predetermined reduction of the accumulator voltage. Thus, a substantially greater discharge of the accumulators is made possible by the DC regulating apparatus in peak demand operation without the supply of the stand-by power supply network at the envisaged nominal voltage being endangered.

In another embodiment of the invention, capacity of the accumulators is increased approximately 6 times the normal capacity provided for stand-by power supplies, because in this way not only is additional capacity made available for the feeding back of energy into the network, but the stand-by power supply network is made safer because the substantially increased capacity not only prolongs the effectiveness of the stand-by power supply network in the case of a breakdown in the network supply, but also enables a substantially heavier discharge of the accumulators during the feedback into the network, without the maintenance of an adequate energy reserve in the accumulators sufficient for the stand-by power supply being endangered.

In a further embodiment of the present invention, when used in substations the consumer is the low voltage level of, for example, 400 V, where considerable accumulator capacities are already available for the stand-by power supply and for the accommodation of further accumulators.

DESCRIPTION OF THE PREFERRED EXEMPLARY EMBODIMENTS

Figure 1:
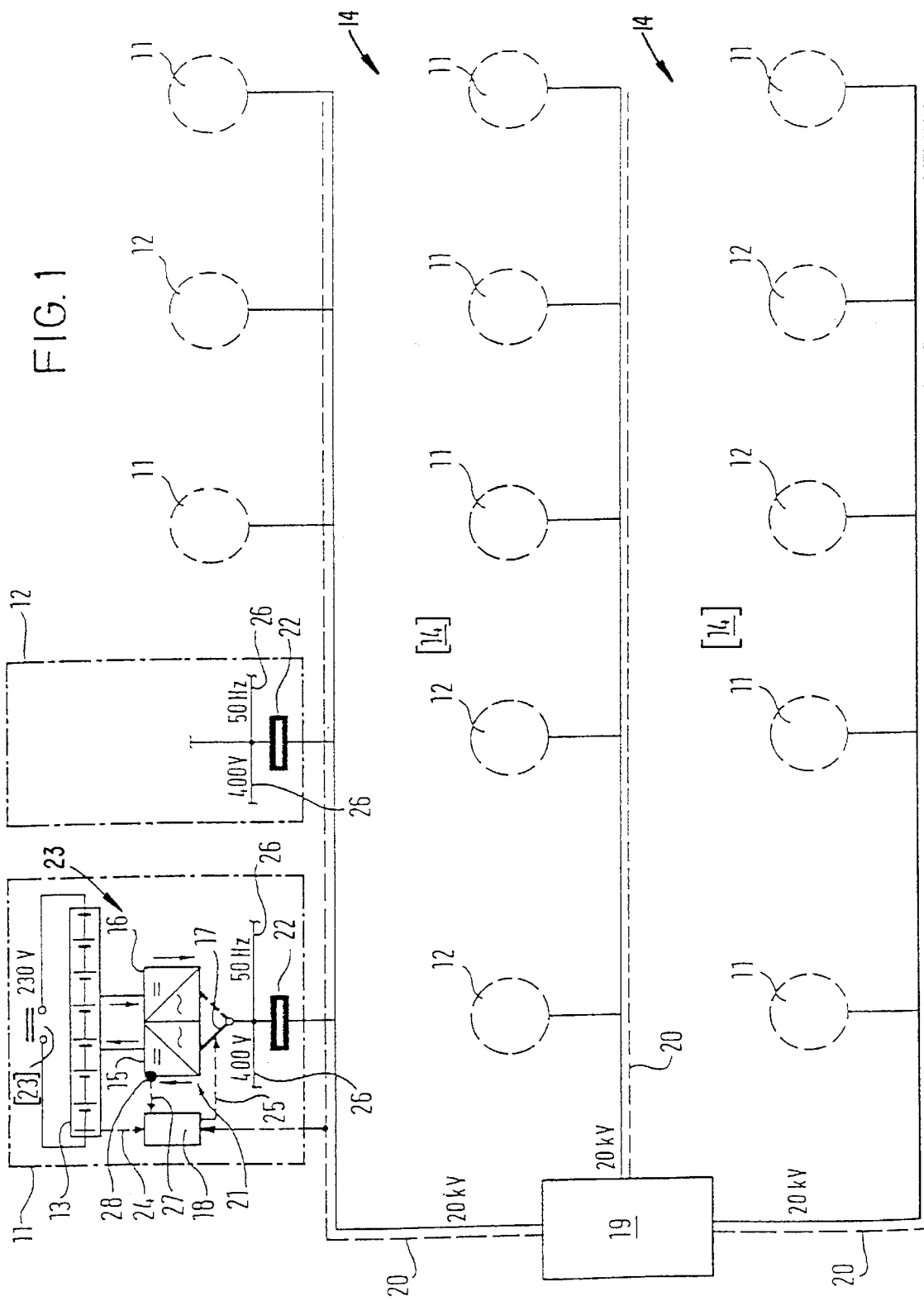
FIG. 1 is a block circuit diagram of a three-phase current network with attached consumers with and without stand-by power supply, wherein the stand-by power supply simultaneously ensures, in accordance with the invention, that electrical energy is made available, which can be fed back into the network.

In accordance with FIG. 1, numerous consumers 11, 12 are connected to a three-phase current medium voltage network (or grid) 14 via transformers 22, with a voltage of, for example, 20 kV, which is fed from a network center 19 via 220/380 kV–110 kV–20 kV substations. Each transformer 22 feeds a low voltage three-phase supply network 26 with a voltage of 400 V and a frequency of 50 Hz.

Whereas the consumers 11 have a stand-by power supply network 23 in addition to the network 26, the consumers 12 do not have such a stand-by power supply.

The stand-by power supply network 23 of the consumers 11 will consist of a set of accumulators 13 which are connected in series, under some circumstances also partly in parallel, the output voltage of which amounts, for example, to 220 V. The accumulators 13 are charged through a rectifier 15 which is connected via a controlled switch 17 to the output of the transformer 22, i.e. to the three-phase supply 26. In this manner, the accumulators 13 are continuously kept in the fully charged state.

In accordance with the invention, an inverter 16 is connected to the set of accumulators 13 in parallel to the rectifier 15 and can be connected by changing over the controlled switch 17 or preferably through a switch-less control into the position indicated in broken lines at the three-phase supply 26, and thus to the secondary side of the transformer 22.

A control apparatus 18 is provided at each of the consumers 11 equipped with a stand-by power supply and is fed via a control line 24 with the data of the accumulators 18, in particular, with their output voltage. Data such as charge balance, power balance, work compensation, faulty handling, working life factors etc. can also be taken into account. Moreover, the control apparatus 18 also receives peak demand switching signals from the network center 19 via a further control line 20. The corresponding control signals are preferably delivered in the same way as the signals of a multi-service control system via the network lines to the control apparatus 18 so that a separate control line 20 is unnecessary. With smaller systems the requisitioning can take place without a direct connection to the network center. The control apparatus measures, for example, yearly work which can be invoiced and accounted for according to a tariff. The ability to operate lies in the operators interest, which can be accounted for in the tariff.

The control apparatus 18 controls the controlled switch 17 either into the position shown in the drawing in solid lines, in which the rectifier 15 is connected to the network 26 or into the position indicated in broken lines in which the inverter 16 is connected to the network 26 in place of the rectifier 15. The control apparatus 18 is connected for this purpose via a control line 25 to the controlled switch 17.

The rectifier 15 and the inverter 16 are combined into a two-way converter 21, which can be selectively switched as a rectifier or inverter via the control line 25.

The operation of the described circuit arrangement is as follows:

In normal operation, the controlled switch 17 is brought by the control apparatus 18 into the position illustrated in solid lines in the drawing, in which the rectifiers 15 are connected to the three-phase supply network 26. In this position the accumulators 13 are charged up and are kept in the fully charged state, since in the normal case the stand-by power supply network 23 does not consume any energy.

If now a peak demand arises suddenly in the network 14, then the network center 19, which can be the customary load distributor, delivers a suitable signal to the control apparatuses 18 of all consumers 11 equipped with a stand-by power supply network 23, which then switch off the rectifier 15 from the three-phase network 26 by changing over the switch 17 and in place of it connect the AC output of the inverter 16 to the three-phase supply network 26 insofar as the control apparatus 18 has established an adequate state of charge of the associated accumulators 13.

For smaller systems, the regulating energy is requisitioned directly from the network without centralized multistation control. In order to arrange the release of such systems in the area in which the tariff is effective, private operators must agree the dimensioning with the competent electricity supply company. In this connection the size of the batteries, of the two-way converter or of a similar component and the level of the alternating loads in the own private network are the amortization parameters which determine the dimensioning rules and tariff provisions.

The switching procedure of the switch 17 should take place in the millisecond range and indeed, in particular, when the rectifier 15 and the inverter 16 are combined into an electronically controlled two-way converter 21. Thus, within a few milliseconds, the accumulators 13 of all stand-by power supply networks 23 connected to the network 14 can concentratedly feed energy into the network 14, and indeed preferably only for a time of 2 to 10 minutes. The total arrangement can be so dimensioned in accordance with a first embodiment that within this time the quantity of energy stored in the accumulators 13 only reduces by a maximum of 20%, so that even in the event that a stand-by power supply is suddenly necessary, adequate energy for this is still available. With new systems or enlargements of existing systems, the quantity of stored energy can also be so laid out that a larger quantity of energy than 20%, for example 30%, can be extracted. The stand-by energy demand and network peak demand jointly determine the total stored energy.

If, for example, an accumulator system 13 with a capacity of 200 Ah is available, then this can, in the stand-by power supply case, deliver energy of the order of magnitude of 50 kWh for, for example, 5 hours.

It is also possible that only 10% of the current corresponding to the capacity, i.e. for example 20 A, are extracted over ten hours from the accumulator system in the stand-by power supply case.

In the peak demand operation, the quantity of energy extracted for a ten-minute extraction amounts to approximately 8.5 kWh and at two-minute extraction 1.7 kWh, with the two-way converter delivering 50 kVA or 100 kVA respectively. In the last named case, the two-way converter 21 should be temperature controlled.

The transformers 22 of the individual consumers 11, 12 are generally laid out at least for a power of 500 kVA. For the purpose of the invention, the transformer 22 for own use is generally so dimensioned that it does not make any power restriction necessary in the ten-minute inverter operation.

The two-way converters 21 generally have an over-load capability of 2.5 times the nominal power over two minutes. A network controlled two-way converter 21 is preferably used, which does not require any special network monitoring and regulation. The network feed-line must be correspondingly adapted.

Depending on the type of construction of the accumulators a higher overload capability is available at low internal resistance. Preferred are systems with low resistance and good chargeability and cycle characteristics, for example, the OCSM technology of the applicants.

The control apparatus 18 controls the kWh balance of the accumulator 13 and additionally monitors, via a control line 27, the temperature of the two-way converter 21, on which a temperature sensor 28 is mounted for this purpose and which feeds the control line 27. Furthermore, the control apparatus 18 should monitor the control voltage level DC voltage, the network frequency and the network voltage, the condition of the accumulator using a centralized, multistation control system, the weak load charging switch on times, the compensation charging and the like.

Thus, in accordance with the invention, energy storage and regulation systems are made available in combination with electrochemical stores and network controlled two-way converters (rotary converters) for central and decentral electricity supply companies and large customer networks, wherein all the existing and future decentralized resources with respect to electrochemical stores, which have hitherto only been used as a DC standby power supply, are additionally jointly used in the short term energy range for regular supply in the three-phase supply network. As a consequential step, the energy stores and regulating systems can be equipped with network controlled two-way converters and the fields of application comprising phase harmonization, phase shifting, immediate reserve, peak load compensation, weak load exploitation as day/night storage, can be included in the decentral small system.

The invention can be used in existing systems by substituting for the rectifier a two-way converter with ca. 10 minute power and dimensioned in accordance with the accumulator size. In new systems, it is recommended that the accumulators and the two-way converter be dimensioned in accordance with the existing size of transformer in order to fully exploit the available spatial circumstances and existing potentials.

In this manner the use of a two-way converter with a frequency voltage regulation with accumulator balancing via remote information or remote control can take place both with existing installations and also with new installations.

The advantages achieved by the invention lie in the improvement
of the regulating speed and thereby reduction of the regular power,
of the primary energy use of existing regulating systems also by weak load exploitation,
of the step-wise procedure in investments matched to the actual performances required,
of the more economical exploitation of decentral, constructional and distribution related preconditions,
of the exploitation of already existing energy storage potentials and improvement of their efficiency,
of the transport paths for electrical power by avoiding peak load transport and regulating transport through decentral use, and
of the system components by means of further development activities via these very economical but small systems for the use of large systems for peak load and day/night storage.

A particular advantage of the invention is thus to be seen in the fact that the peak load demand need not be made available from a central position by feeding in a large quantity of energy, but rather through many decentral small systems, which admittedly feed their energy in small quantities into the network, but distribute it relatively uniformly over the total network.

In this manner, the resistance losses on feeding in the peak demand are substantially reduced.

In FIG. 1, the design of the consumers 11, 12 is only shown once in detail. The circles in broken lines designated with the reference numerals 11, 12 represent the same design as is shown in detail once at the top left.

Figure 2:
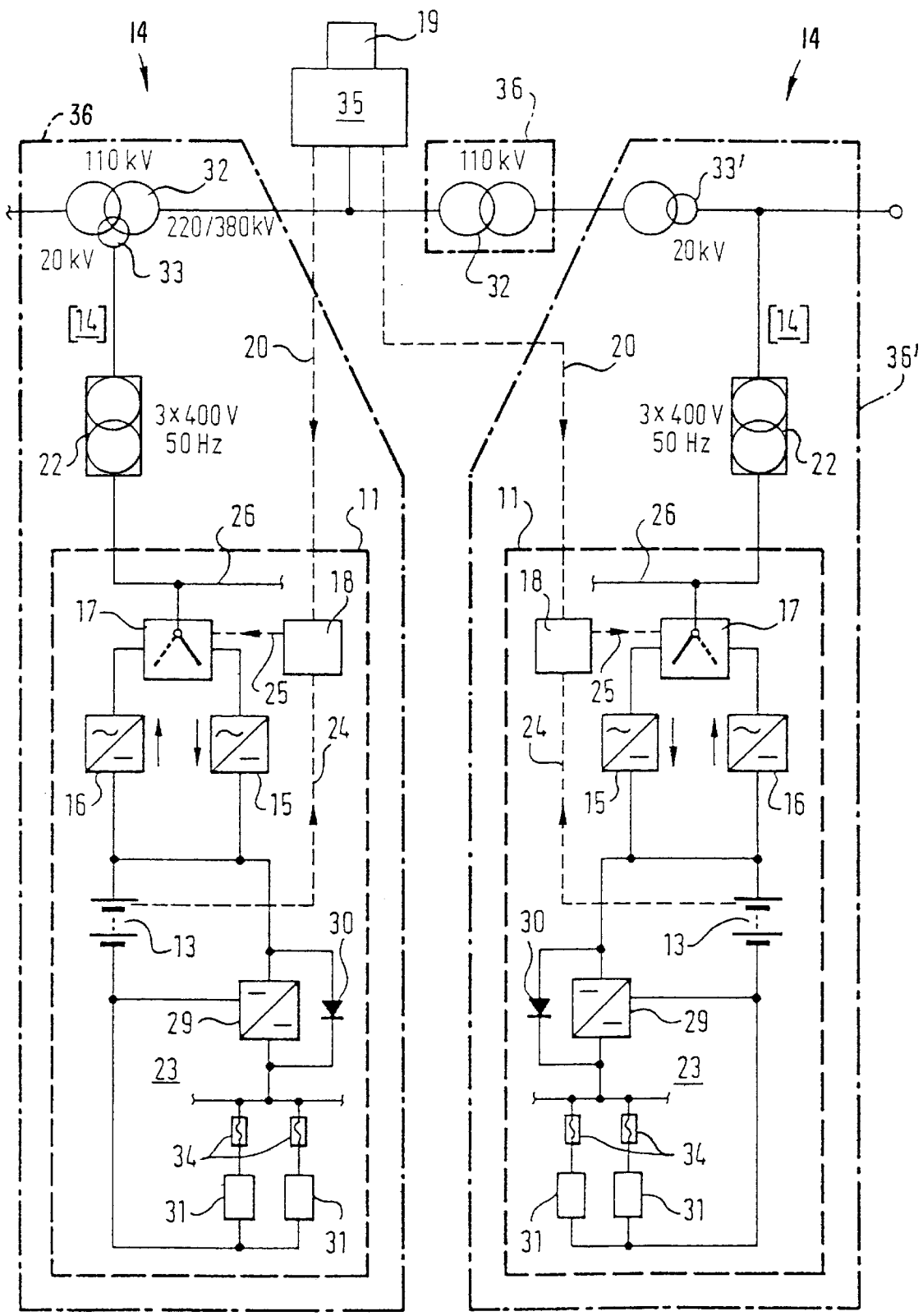
FIG. 2 is a block circuit diagram of a circuit arrangement in accordance with the invention when used in substations.

In FIG. 2, the same reference numerals designate components which correspond to those in FIG. 1.

In accordance with FIG. 2, a power station 35 having the network center 19 feeds a 220/380 kV-three-phase supply network, which has substations 36 and transformers 32 at specific intervals, which transform the high voltage down to 110 kV. The 110 kV voltage is then either transformed down to 20 kV in the same substation 36 (illustration in the lefthand half of FIG. 2) or in a regional substation 36' at the start of a regional network (illustration in the right-hand half of FIG. 2) via a tertiary winding 33 provided at the transformer 32 or via a further transformer system 33'. The output of the tertiary winding 33 or of the transformer 33' is applied to the three-phase medium voltage network 14, the voltage of which is transformed down by transformers 22 to a voltage of 3×400 V, and delivers it to a three-phase supply network 26 including a consumer 11. The three-phase supply network can be located within the substation 36, 36' intended and designed merely for connection to a stand-by power supply which can be enhanced, if necessary, by additional accumulator capacity.

As in the example of FIG. 1, the low voltage three-phase supply networks 26 are connected via controlled switches 17, in particular, semiconductor switches, to the rectifiers 15 or inverters 16, which are connected to a set of accumulators 13. It should be pointed out that in FIG. 2 the single-pole representation of the lines from the power station 35 up to the accumulators 13 has been selected for the sake of simplicity, while both the positive and also the negative lines are reproduced schematically in the connection to the accumulators 13.

The control apparatus 18 again receives the data from the accumulator 13 via a control line 24 and also the control signals from the network center 19 via a control line 20 and forms a control signal for the controlled switch 17 from the received signals, with the control signal being applied to the controlled switch 17 via the control line 25.

In FIG. 2 there are also shown, in each case, two stand-by power loads 31 connected to the stand-by power supply network 23 via fuses 34.

In supplementation of the circuit of FIG. 1, the stand-by power supply networks 23 of FIG. 2 have a DC voltage regulating apparatus in the form of a step-up setter 29, between the accumulators 13 and the stand-by power loads 31, with a rectifier arrangement connected in the forward direction, in particular a diode 30, being connected in parallel to the step-up setter 29. The step-up setter 29 delivers at its output a voltage which corresponds to the full charge voltage of the set of accumulators 13, or a voltage lying a few percent above it, and indeed independently of the value to which the voltage of the accumulators 13 sinks within a predetermined range of, for example, 220 V and 180 V. In this manner, the stand-by power loads 31 are supplied with the required nominal voltage, even when the accumulator voltage drops, which is particularly important when extracting accumulator energy to satisfy peak demands.

The diode 30 connected in parallel to the step-up setters 29 has the purpose that a current which exceeds the maximum current of the step-up setter 29 can flow when a short circuit takes place at the stand-by power load side, which is, for example, necessary in order to ensure that the fuses 34 provided in the current circuit of the stand-by power load 31 respond, and in particular, melt.

The step-up setter 29 is so controlled or operated that the voltage at its output is somewhat more positive than at its input, so that no current flows through the diode 30 as long as the step-up setter 29 delivers an operating current which lies beneath its maximum current. Only when the maximum current is achieved, does the input side of the step-up setter 29 become somewhat more positive than the voltage at the output side, so that now current can, also flow via the diode 30 and can in particular, become so large that the fuses 34 respond.

In accordance with FIG. 2, the stand-by power supply of a 220/380 kV substation 36 or of a regional 110 kV substation 36' are used for the purpose of the invention. It has the advantage that one can turn extensively to existing systems, such as a share of the building, 20 kV switching system, 20 kV/400 V transformers, 400 V switching systems and DC distribution to the full extent, and one only needs to additionally install the inverters 16 and also the switching and control elements 17, 18. Furthermore, the advantage exists here that the accumulator sets already have relatively high capacities from the outset. Since the battery chambers of such substations 36, 36' generally have adequate space for the accommodation of additional accumulator capacities, it is advantageous when, for example, instead of an accumulator capacity of 300 Ah in the battery chambers, an accumulator capacity of 1740 Ah is accommodated. This not only makes available a higher energy feedback capacity, but also signifies a substantial improvement of the stand-by power supply, since the latter can be operated longer in the case of a breakdown. Moreover, a heavier discharge of the accumulators 13 can take place in the network peak demand operation, because in this case the residual capacity is still adequate for a sufficient supply of the stand-by power supply network 23, in particular, in conjunction with the step-up setters 29.

For 220/380 kV substations, an immediate power reserve for about 15 minutes can be made available in this manner. In normal networks, 10 to 30 and, in particular approximately 20 larger substations 36 are available in order to make available an adequate power reserve by means of the accumulators 13 that are used. Thus, a network reserve of ca. 500 kW per substation can be made available which, on connecting together 20 larger substations, corresponds to an immediate reserve of ca. 10 MW.

Smaller powers of up to 200 kW per substation can also be realized in analogous manner in smaller substations 36'.

In accordance with the invention, the rectifiers 15 are switched off by the changeover switch during the feedback into the network via the inverters 16. The step-up setters 29 used in accordance with the invention continue to ensure a supply of the stand-by power load 31 with the nominal voltage of 220 V, when voltage drops of up to 50 V arise at the accumulators 13.

A further possibility of realizing the invention consists in an energy reverse in the accumulator taking place automatically even without a control line (20 in FIG. 1) to the load distributor, when the network requisitions the energy for assistance. Suitable measures determine the work made available or the yearly balance for the purpose of calculation of the tariff, or via a basic fee depending on the size of the accumulators and the possibilities, which are theoretically present.

What is claimed is:

1. A method of covering peak energy demand in an electrical AC or three-phase current network having a plurality of consumers of which at least some of the consumers are equipped with a stand-by power supply network having accumulators and at least one rectifier fed from the electrical network, the method comprising feeding, for a short term peak demand of the electrical network, a fraction of energy from the accumulators of each individual stand-by power supply network into the electrical network via an inverter as long as a peak demand is present and sufficient energy of the stand-by power supply networks is still available in the accumulators.

2. A method in accordance with claim 1, wherein the energy of each stand-by supply network is made available within milliseconds.

3. A method in accordance with claim 1, wherein energy from the accumulators is made available for the peak load demand only for minutes.

4. A method in accordance with claim 1, wherein the consumer is the low voltage level of, for example, 400 V in a substation.

5. A circuit arrangement in accordance with claim 1, wherein the rectifier and the inverter are united into a two-way converter which can be selectively switched as a rectifier or inverter by the control apparatus via the control line.

6. A method in accordance with claim 1, further comprising taking, in peak demand delivery operation, a current at the level of substantially 100% of the hour capacity from the accumulators, in stand-by supply operation a current with a level of up to a maximum of 20% of the hour capacity.

7. A method in accordance with claim 6 wherein the current is up to a maximum of 10% of the hour capacity.

8. A method in accordance with claim 1, further comprising keeping the voltage of each stand-by supply network at an at least substantially constant desired value, independent of the accumulator voltage, by a DC voltage regulating apparatus.

9. A method in accordance with claim 8, further comprising providing a rectifier arrangement poled in the forward direction that is arranged parallel to the DC regulating apparatus and at least partly takes on the current conduction when a stand-by current consumption is demanded, which lies above the maximum current of the DC regulating apparatus.

10. A method in accordance with claim 1, wherein only so much energy is fed from the accumulators to cover the peak demand of the electrical network that the energy content of each stand-by supply network sinks by at most 50%.

11. A method in accordance with claim 10 wherein the energy content of each stand-by supply network sinks by at most 20%.

12. A method in accordance with claim 10 wherein the energy content of each stand-by supply network sinks by at most 20%.

13. A method in accordance with claim 1, wherein the capacity of the accumulators is increased by 2 to 10 times the normal capacity provided for the stand-by power supply network.

14. A method in accordance with claim 13 wherein the capacity of the accumulators is increased by 4 to 8 times the normal capacity provided for the stand-by power supply network.

15. A method in accordance with claim 14 wherein the capacity of the accumulators is increased by approximately 6 times the normal capacity provided for the stand-by power supply network.

16. A method in accordance with claim 1, further comprising taking in peak load delivery operation, a current from the accumulators, which is so high that the accumulators can only give up a fraction of their capacity while maintaining a voltage which is still sufficient for the operation of the inverter.

17. A method in accordance with claim 4, wherein the fraction amounts to 10 to 50%.

18. A method in accordance with claim 17 wherein the fraction amounts to between 20 and 40%.

19. A method in accordance with claim 17 wherein the fraction amounts to approximately 30%.

20. A method in accordance with claim 1, wherein energy extraction from the accumulators in peak demand delivery operation takes place within a short time with such an intensity that the accumulator voltage sinks significantly below the nominal value envisaged for the operation of each stand-by power supply network.

21. A method in accordance with claim 9, wherein the energy extraction from the accumulators in peak demand delivery operation takes place within a short time with such an intensity that the accumulator voltage has sunk by 10 to 20% the fully charged accumulator voltage provided for the operation of each stand-by power supply network.

22. A method in accordance with claim 21 having at least one set of accumulators delivering a DC voltage of substantially 220 V, wherein energy removal from the accumulators in peak delivery operation takes place within a short time up until a reduction of the DC accumulator voltage to 170 to 190 V.

23. A method in accordance with claim 21 wherein the accumulator voltage has sunk by 20% beneath the nominal value.

24. A method in accordance with claim 22 wherein the reduction of the DC accumulator voltage is approximately 180 V.

25. A circuit arrangement for covering the peak energy demand in an electrical AC or three-phase current network having a plurality of consumers, of which at least some of the consumers are equipped with a stand-by power supply network which has accumulators and at least one rectifier fed from the electrical network for the charging of the accumulators, wherein at least a substantial part of all the consumers equipped with a stand-by power supply network is additionally equipped with at least one inverter fed from the electrical accumulators, which, by means of a control apparatus, can be applied to the electrical network instead of the rectifier, and which has a current conducting capacity such that the accumulators can transmit a substantial fraction of their energy of 10 to 15% to the electrical network within a short period of time of a few minutes when the inverters are applied to the electrical network.

26. A circuit arrangement in accordance with claim 23, wherein the control apparatus is connected via control lines to a network center and to the accumulators and connects the inverter via a further control line to the electrical network when a short term peak demand of the electrical network has to be covered, and the state of charge of the accumulators, permits this, and wherein the inverter is disconnected from the electrical network when one of the above named conditions is no longer satisfied.

27. A circuit arrangement in accordance with claim 25, wherein the inverter can be connected to the electrical network in place of the rectifier by actuation of a controlled switch.

28. A circuit arrangement in accordance with claim 25, wherein the consumer is the low voltage level of, for example, 400 V in a substation.

29. A circuit arrangement in accordance with claim 25 wherein the accumulators can transmit a substantial fraction of their energy of between 30 to 40% to the electrical network within a short period of time.

30. A circuit arrangement is accordance with claim 25 wherein the accumulators can transmit 30% of their energy to the electrical network within a short period of time of a few minutes.

31. A circuit arrangement in accordance with claim 25 wherein the transmission of a substantial fraction of the energy from the accumulators is within between 1 and 20 minutes.

32. A circuit arrangement in accordance with claim 31 wherein the transmission of substantial fraction of the energy from the accumulators takes place within between 2 and 10 minutes.

33. A circuit arrangement in accordance with claim 25, wherein the capacity of the accumulators is increased by 2 to 10 times the normal capacity provided for the stand-by power supply network.

34. A circuit arrangement in accordance with claim 33 wherein the capacity of the accumulators is increased by 4 to 8 times the normal capacity provided for the stand-by power supply network.

35. A circuit arrangement in accordance with claim 25, wherein the electrical network is a medium voltage three-phase current network to which the consumers are connected via transformers which transmit a low AC voltage or three-phase voltage.

36. A circuit arrangement in accordance with claim 35 wherein the three-phase current network is of 20 k.

37. A circuit arrangement in accordance with claim 35 wherein the low AC voltage or three-phase voltage is approximately 400 V.

38. A circuit arrangement in accordance with claim 35, wherein the accumulators, deliver a low DC voltage to the stand-by power supply network.

39. A circuit arrangement in accordance with claim 38 wherein the accumulators deliver a DC voltage of approximately 220 V.

40. A circuit arrangement in accordance with claim 25, wherein a DC regulating apparatus is inserted between the accumulators and the stand-by power load, which maintains the voltage applied to the stand-by power load or loads at least substantially constant up to a predetermined reduction of the accumulator voltage.

41. A circuit arrangement in accordance with claim 40, wherein the DC regulating apparatus is a step-up setter.

42. A circuit arrangement in accordance with claim 40, wherein the DC regulating apparatus keeps the voltage applied to the stand-by power load or loads at least substantially constant until the accumulator voltage has sunk by 10 to 30% beneath the full charge value.

43. A circuit arrangement in accordance with the claim 42 wherein the accumulator voltage has sunk by approximately 20% beneath the full charge value.

44. A circuit arrangement in accordance with claim 40, having at least one set of accumulators delivering a DC voltage of substantially 220 V, wherein the DC regulating apparatus is so designed that the energy extraction from the accumulators in peak demand delivery operation takes place up to a reduction of the accumulator DC voltage to 170 to 190 V.

45. A circuit arrangement in accordance with claim 44 wherein the energy extraction from the accumulators in peak demand delivery operation takes place up to a reduction of the accumulator DC voltage to approximately 180 V.

46. A circuit arrangement in accordance with claim 40, wherein a rectifier arrangement is arranged parallel to the DC voltage regulating apparatus, and at least partly takes on the DC current conduction when a stand-by power consumption lying above the maximum current of the DC regulating apparatus is required.

47. A circuit arrangement in accordance with claim 46 wherein the rectifier arrangement consists of a diode poled in the forward direction.

48. A circuit arrangement in accordance with claim 47 wherein the capacity of the accumulators is increased by approximately 6 times normal capacity provided for the stand-by power supply network.

* * * * *